(12) United States Patent
Wittenberg et al.

(10) Patent No.: US 7,071,867 B2
(45) Date of Patent: Jul. 4, 2006

(54) METHOD, APPARATUS, AND COMPUTER PROGRAM PRODUCT FOR RADAR DETECTION OF MOVING TARGET

(75) Inventors: Peter S. Wittenberg, Creve Coeur, MO (US); Aaron Y. Mosher, Madison, AL (US)

(73) Assignee: The Boeing Company, Chicago, IL (US)

(*) Notice: Subject to any disclaimer, the term of this patent is extended or adjusted under 35 U.S.C. 154(b) by 195 days.

(21) Appl. No.: 10/877,261

(22) Filed: Jun. 25, 2004

(65) Prior Publication Data

US 2005/0285774 A1    Dec. 29, 2005

(51) Int. Cl.
G01S 13/93 (2006.01)

(52) U.S. Cl. ............................. 342/70; 342/75; 342/90; 342/95; 342/96; 342/157; 342/158; 342/160

(58) Field of Classification Search ............ 342/70–72, 342/75, 90–96, 157–162, 189
See application file for complete search history.

(56) References Cited

U.S. PATENT DOCUMENTS 3,680,103 A * 7/1972 Houser et al. ............ 342/25 E
5,587,929 A   12/1996 League et al.
5,668,739 A    9/1997 League et al.
5,680,313 A   10/1997 Whittaker et al.
2005/0285774 A1 * 12/2005 Wittenberg et al. .......... 342/70

OTHER PUBLICATIONS

"Robust adaptive beamforming for HF surface wave over-the-horizon radar", Fabrizio, G.A.; Gershman, A.B.; Turley, M.D. Aerospace and Electronic Systems, IEEE Transactions on vol. 40, Issue 2, Apr. 2004 Ps: 510-525.*

* cited by examiner

Primary Examiner—John B. Sotomayor
(74) Attorney, Agent, or Firm—Alston & Bird LLP (57) ABSTRACT

Methods, apparatus, and computer program products are provided for tracking at least one moving target with a radar device without requiring the use of Doppler information. The invention comprises scanning an area with radar signals at a first time to receive a first plurality of target data signals indicative of a position of the target at the first time and determining the position of the target at the first time by collecting the first plurality of target data signals into a first target data grouping, such that the first target data grouping defines a first reference point. Similarly, a second reference point for the target is determined for a second time, and the position of the first reference point is compared to the position of the second reference point to track the moving target. Advantageously, the tracked positions of the moving target may be used to predict a future position of the target at a subsequent time.

30 Claims, 4 Drawing Sheets

METHOD, APPARATUS, AND COMPUTER PROGRAM PRODUCT FOR RADAR DETECTION OF MOVING TARGET

BACKGROUND OF THE INVENTION

1. Field of the Invention

The present invention is related to the detection of moving targets, and more particularly, to methods, apparatus, and computer program products for tracking a moving target without requiring the use of Doppler information.

2. Description of Related Art

Radar devices, such as real beam radars, laser radars, sonar, and the like, transmit signals, such as electromagnetic or sonar signals, that advantageously reflect off targets and are received by the radar device to provide data related to the position of the target. Targets detected by radar devices may be stationary or moving objects. Radar devices typically comprise an antenna that transmits and receives the radar signals. Signals received by the radar device provide target data, such as the target's distance from the radar device or size. Some radar devices, such as a radar device used on an autonomous vehicle, typically rotate the antenna through 360° to detect targets within the area swept by the antenna, such as an area proximate the autonomous vehicle.

To track a moving target, radar devices typically detect the motion of the target based upon Doppler information provided by the radar signals that are reflected off the moving target. The movement of the target in a radial direction, relative to the radar device, causes the radar signals that reflect off the moving target to return to the radar device with a frequency that is different than the frequency that was transmitted by the radar device. Specifically, the radial movement of the target changes the frequency of the radar signal an amount that is proportional to the relative velocity of the target such that the change in frequency of the radar signal may be used to determine the location and speed of the moving target and to accordingly track the moving target.

However, such use of Doppler information is capable of tracking only radial movement of targets, as opposed to tangential movement of targets. Tangential movement of targets, relative to the rotating radar signal of the radar device, does not change the frequency of the signal and, accordingly, does not enable determination of the speed of the moving target. Therefore, a need exists for a method of tracking a tangentially moving target. Furthermore, a need exists for a method of navigating an autonomous vehicle using such a method of tracking a tangentially moving target.

BRIEF SUMMARY OF THE INVENTION

Methods, apparatus, and computer program products are provided according to the present invention for tracking a moving target, including a tangentially moving target, with a radar device without the use of Doppler information. In addition, the present invention provides for navigating an autonomous vehicle according to the tracked movement of the target. A moving target can be scanned at two different times so that target data signals returned from the target at the two times can be used to determine the location of the target at each time. By comparing the position of the target at the first and second times, the movement of the target can be tracked without the use of Doppler information. Furthermore, by tracking the moving target, an autonomous vehicle can be navigated relative to the moving target.

According to the present invention, the radar device scans an area with radar signals at a first time to receive a first plurality of target data signals indicative of a position of the target at the first time. Advantageously, the radar device scans the area with a real beam radar signal, or a laser radar signal, through 360°. After the radar device has received the first plurality of target data signals, the position of the target is determined, such as by processing circuitry, at the first time by collecting the first plurality of target data signals into a first target data grouping, such that the first target data grouping defines a first reference point. Advantageously, the position of the target is determined by parameterizing the first plurality of target data signals based upon predetermined criteria, such as decibel levels, to define the first target data grouping and first reference point that are indicative of the position of the target.

The radar device also scans the area with radar signals at a second time, that is different than the first time, to receive a second plurality of target data signals and determine the position of the target at the second time by a similar procedure as used at the first time. The positions of the first reference point at the first time and the second reference point at the second time are compared, such as by processing circuitry, to track the moving target, such that no Doppler information is required to track the moving target. Advantageously, the present invention provides for the prediction, such as by processing circuitry, of at least one future position of the moving target at a third time based upon the previously tracked positions of the moving target.

Further embodiments of the present invention provide for the navigation, such as by processing circuitry, of an autonomous vehicle relative to a moving target. An area proximate the autonomous vehicle is scanned to determine the position of first and second reference points indicative of positions of the moving target. The moving target is tracked by comparing the position of the first reference point to the position of the second reference point. To navigate the autonomous vehicle, a trajectory of the autonomous vehicle may be determined, such as by processing circuitry, based upon the tracked positions of the moving target relative to the vehicle.

Therefore, embodiments of the present invention allow tracking of moving targets, including tangentially moving targets using a radar device without the use of Doppler information. Furthermore, embodiments of the present invention enable an autonomous vehicle to be navigated relative to a moving target without using Doppler information.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 1–4, the tracking of at least one moving target without requiring the use of Doppler information in accordance with one embodiment of the methods, apparatus, and computer program products of the present invention is illustrated. Embodiments of the present invention provide for the tracking of moving targets with a radar device independent of Doppler information that may be provided by radar signals that are transmitted and received to determine the positions of the target. The embodiments of the invention described herein are utilized in conjunction with a real beam radar device, such as the DS2000 77 GHz Frequency Modulated Continuous Wave (FMCW) Radar manufactured by Navtech (Navtech DS2000). However, it should be appreciated that other embodiments of the present invention may be utilized in conjunction with alternative radar devices that transmit and receive alternative electromagnetic signals, such as laser radar signals, or even sonar signals. Accordingly, non-limiting examples of specific alternative radar devices of the present invention include laser radar and sonar. Although sonar devices transmit and receive mechanical/acoustical signals, rather than electromagnetic signals of typical radar devices, sonar devices are considered herein to be included in the term radar device.

The embodiments of the invention described herein may be utilized in conjunction with the navigation of an autonomous vehicle. In this regard, the radar devices of the present invention are used to track at least one moving target without requiring the use of Doppler information so that the trajectory of the autonomous vehicle can be determined based upon the tracked positions of the moving target relative to the vehicle. The embodiments described herein are utilized in conjunction with an autonomous automobile, such as a car or truck, for example. However, it should be appreciated that further embodiments of the present invention may be utilized with alternative autonomous vehicles, such as aircraft, watercraft, military vehicles, or any other transportation device, or in conjunction with other tracking applications. Still further embodiments of the present invention may be used in non-transportation applications, such as stationary tracking systems for moving components during manufacturing or other ground-based radar systems used to track moving vehicles such as aircraft or automobiles, to list non-limiting examples of the present invention.

Figure 1:
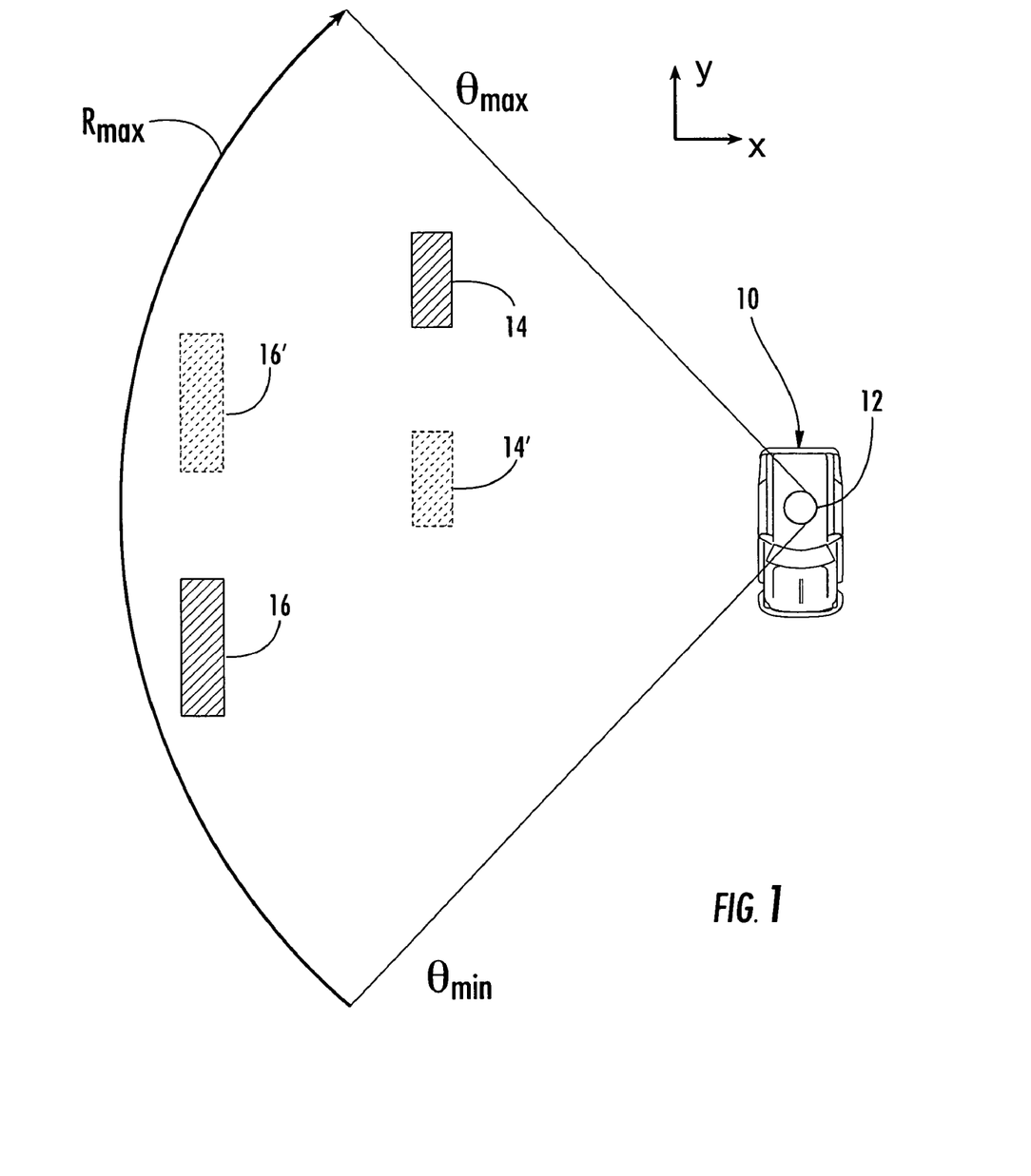
FIG. 1 is a diagrammatic view of a radar device scanning two moving targets in accordance with one embodiment of the present invention, wherein the positions of each target are illustrated at a first time and a second time.

Referring to FIG. 1, an autonomous vehicle 10 comprises a radar device 12, such as the Navtech DS2000, that scans an area proximate the autonomous vehicle. The radar device 12 continuously sweeps a real beam radar signal through 360° at a speed of 900°/sec. The radar device 12 also sends and receives radar signals every millisecond such that each discrete signal defines a 1.8° azimuth beamwidth. Further embodiments of the present invention may comprise alternative radar devices that sweep over areas of different size and/or at different speeds. Still further embodiments of the present invention may scan the area with radar signals by techniques other than sweeping. The area scanned by the radar device 12 of FIG. 1 comprises an area proximate the autonomous vehicle 10 and comprises a radial distance defined by the effective range of the radar device. The effective range of the radar device 12 of FIG. 1 is illustrated by $R_{max}$. Furthermore, an area scanned by the radar device 12 is shown from $\theta_{min}$ to $\theta_{max}$ in a clockwise direction that is approximately 90° in angular displacement. However, it should be appreciated that the Navtech DS2000 of the illustrated embodiment scans an area defining 360°, and the area shown from $\theta_{min}$ to $\theta_{max}$ is for illustrative purposes only. Further embodiments of the present invention may scan areas of alternative size or shape.

The radar device 12 of FIG. 1 is mounted to an autonomous vehicle 10 that may be stationary or moving at the time the radar device is scanning the area proximate the vehicle. Further embodiments of the present invention may also mount the radar device to alternative structures, such any targeting positioning system used to detect targets that are moving relative to the structure, such as weapon guidance systems, automated manufacturing facilities, traffic control systems, or any other structures or systems that may track the position of at least one moving target. Such tracking of a moving target is advantageous for determining a function or performing an operation for the structure or system based upon the tracked position of the moving target, such as determining a trajectory of a weapon to collide with the moving target, determining a position to intercept a product being manufactured, determining a trajectory of one or more vehicles to avoid collisions, or any other function for the various applications of the present invention, to list non-limiting examples.

Figure 2:
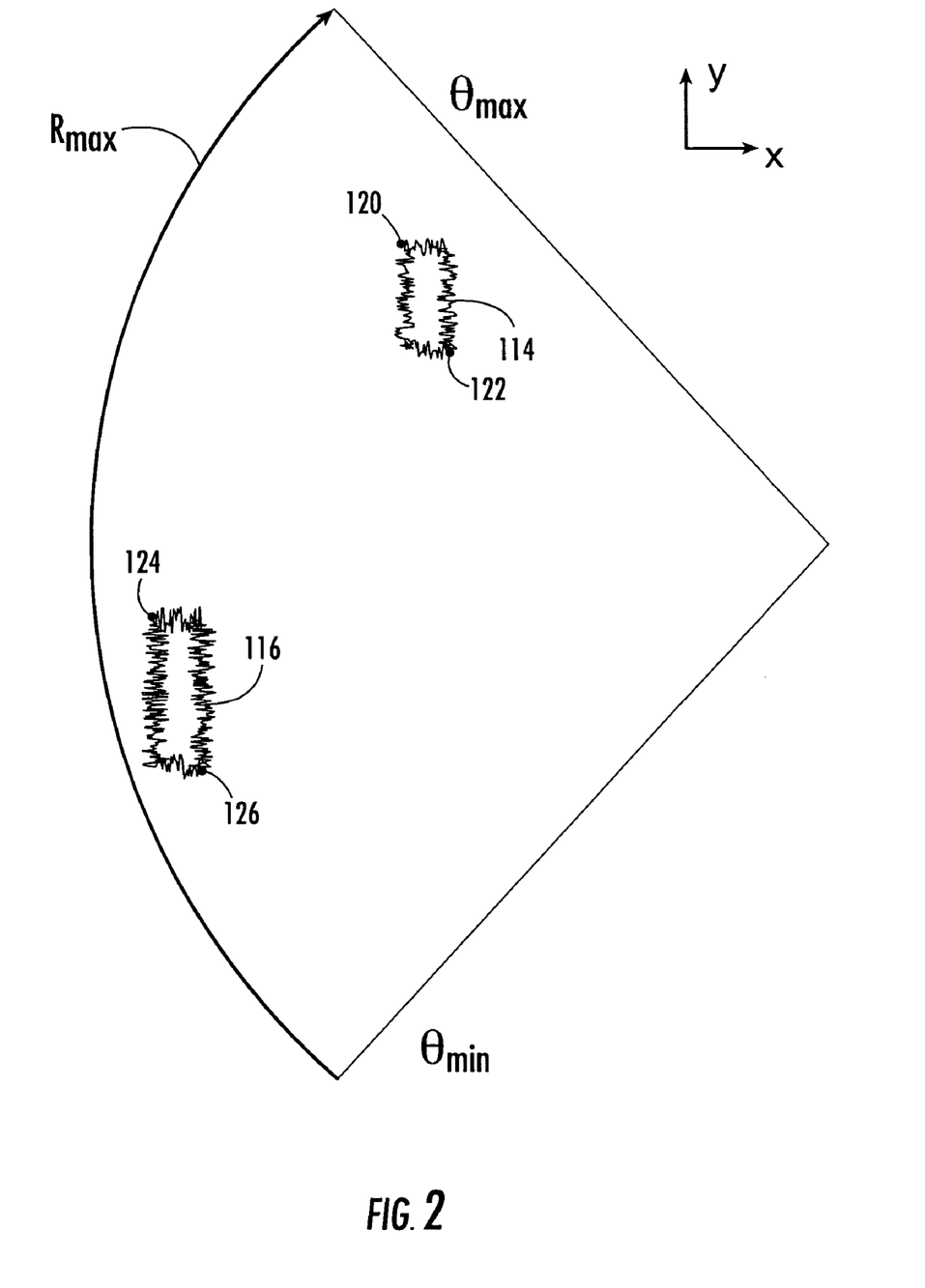
FIG. 2 is a diagrammatic view illustrating a first target data grouping for each target received by the radar device of FIG. 1 at a first time, wherein each first target data grouping defines a first reference point.
Figure 3:
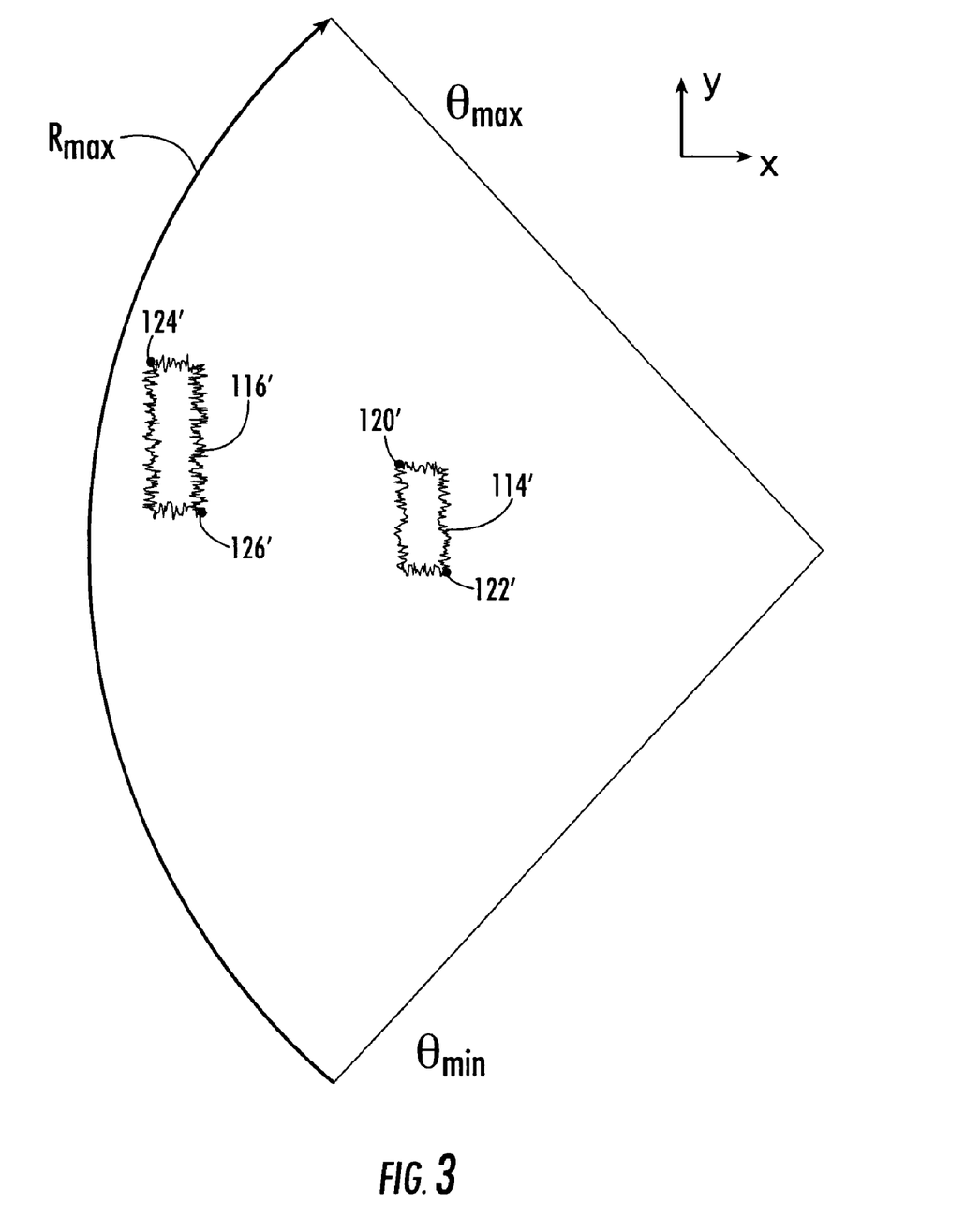
FIG. 3 is a diagrammatic view illustrating a second target data grouping for each target received by the radar device of FIG. 1 at a second time, wherein each second target data grouping defines a second reference point.

The autonomous vehicle 10 of FIG. 1 scans an area proximate the vehicle with radar signals to determine the position of targets 14 and 16, which in the illustrated embodiment may be other vehicles, to track the moving targets. As shown in FIG. 1, the moving targets are positioned at a first position 14 and 16 at a first time and at a second position 14' and 16', respectively, at a second time. The first and second times are the substantially instantaneous amounts of time required to scan a single target and may define a relatively small interval of time that is required to scan a target. Further embodiments of the present invention may define the first and second times as the interval of time required for a single, complete scan of the area proximate the radar device. The first and second times illustrated in FIGS. 1–3 are separated by the 0.4 seconds between each 360° sweep of the rotating radar of the Navtech DS2000. However, the first and second times may be separated by any amount of time, which may depend, for example, on the angular speed of the radar device, or the first and second times may not be defined by consecutive sweeps of the radar device, to list non-limiting examples of how the first and second times are defined. The second time is different than the first time, and is advantageously subsequent to the first time. The radar device 10 of the present invention may also scan the area before and after the first and second times for further target tracking purposes such that the radar device may continuously determine the position of at least one moving target so long as the target is within the range of the radar device.

FIG. 1 includes an illustration of an x- and y-axis coordinate system, and the first moving target 14 is illustrated as moving in a generally negative y-direction from a first time to a second time, and the second moving target is illustrated as moving in a generally positive y-direction from the first time to the second time. Furthermore, the moving targets of FIG. 1 are shown offset from the autonomous vehicle 10 in a generally negative x-direction such that their respective movements in the y-direction are substantially tangential to the sweeping radar signals of the radar device 12. Further embodiments of the present invention may be used with moving targets that are moving both tangentially and radially with respect to the radar device, or substantially radially with respect to the radar device such that the methods, apparatus, and computer program products of the present invention track the moving target without requiring the use of Doppler information. Therefore, the radar device of the present invention may be used to track the movement of targets in any non-axial direction relative to the radar device, and further embodiments of the present invention may also track the moving target in an axial direction (along the z-axis, which is not shown) relative to the radar device. It should also be appreciated that the autonomous vehicle 10 of FIG. 1 may be stationary during the first and second times or may move between the first and second times. The vehicle 10 of FIG. 1 advantageously moves in a negative y-direction from the first time to the second time. The vehicle 10 of FIG. 1 may also move in x- and/or z-directions in further embodiments of the invention.

The radar device 12 of the illustrated embodiment scans the area with real beam radar signals at a first time to receive a first plurality of target data signals that are indicative of a position of the moving target 14 or 16 at the first time. The radar device 12 advantageously receives the first plurality of target data signals to produce an analog or digital signal that is sent to processing circuitry. The processing circuitry, such as a microprocessor or other computing device operating under control of a computer program product, determines the position of the target 14 or 16 at the first time by collecting the first plurality of target data signals into a first target data grouping, such as the first target data groupings 114 and 116, respectively, illustrated in FIG. 2. The target data groupings 114 and 116, also known as "blobs," are not necessarily represented graphically by the methods, apparatus, and computer program products of the present invention; however, the target data groupings of FIGS. 2 and 3 are provided for discussion purposes. The radar signals that are transmitted from the radar device 12 of FIG. 1 reflect off various objects, including moving targets such as other vehicles, to provide target data signals of various decibel levels generally based upon the cross-sectional area of the object, such as a target, from which the radar signal reflects. The radar device 12 of FIG. 1 in actual use will provide additional target data signals than the pluralities of target data signals 114 and 116 of FIG. 2 and 114' and 116' of FIG. 3. Specifically, the target data signals illustrated do not include signals produced by noise or by other objects, such as the terrain, to list non-limiting examples of additional target data signals. Much of the noise and other spurious return signals are filtered out by setting appropriate threshold levels of predetermined criteria described more fully below.

The target data signals of the illustrated embodiment of the present invention advantageously define decibel levels that are indicative of the cross-sectional area of the objects, such as targets, from which the transmitted radar signals reflected. The decibel level is effectively a proportion of the amount of transmitted radar signal that is returned as a target data signal. The amount of time between the transmission of the radar signal and the reception of the target data signals indicates the radial distance of the object, such as a target, from the radar device at that particular azimuth beamwidth. Target data signals provided at additional azimuth beamwidths, particularly neighboring beamwidths, provide additional information about the objects, such as targets, such as the size, shape, orientation, or other properties of the target in a generally tangential direction. The processing circuitry of the present invention advantageously processes a plurality of target data signals to collect the target data signals, from at least one azimuth beamwidth for the illustrated embodiment, into a target data grouping, such as the target data groupings of FIGS. 2 and 3. The target data signals are advantageously parameterized based upon their decibel levels at the various radial distances from the radar device 12. The target data signals may be compared to the predetermined criteria, such as minimal decibel levels, to indicate the presence of a target, the perimeter of a target data grouping, a reference point in the target data grouping, or the like to list non-limiting examples of determinations based upon predetermined criteria. The minimal decibel levels of the predetermined criteria of the present invention will depend upon the particular radar device of each embodiment; however, the predetermined criteria, whether decibel level or an alternative parameter, should be selected to eliminate noise, false targets, and other undesirable determinations so that the presence of actual targets may be more effectively determined.

Referring again to the illustrated embodiment of FIGS. 1–3, the first plurality of target data signals are collected into a first target data grouping because the first plurality of target data signals include signals above a certain decibel level threshold, such as 3, 5, 10, or 20 decibels to list non-limiting examples, that have been predetermined to represent the presence of a target. Some embodiments of the present invention may vary the threshold decibel level of the predetermined criteria based upon the range of the target data signals, such that target data signals indicating a target at a relatively long range may have a threshold decibel level relatively less than target data signals indicating a target at a relatively close range. Still further embodiments of the present invention may define the predetermined criteria by alternative techniques. The target data signals greater than the predetermined criteria are typically received within sequential azimuth beamwidth, wherein such azimuth beamwidths advantageously coincide with the angular position of the moving target relative to the radar device. If a target data grouping is divided by one or more azimuth beamwidths without target data signals above the predetermined criteria at substantially the same range as the target data signals of the target data grouping, then some embodiments of the present invention may define that target data grouping as two discrete target data groupings divided along the one or more azimuth beamwidths without target data signals above the predetermined criteria. Still further embodiments of the present invention may define the target data groupings by alternative techniques or predetermined criteria The processing circuitry of the present invention advantageously collects the target data signals of the first plurality of target data signals having a decibel level above the predetermined criteria into a two-dimensional representation defining at least one reference point and advantageously defining a perimeter. The two-dimensional representation is typically indicative of the size and shape of the target, although the present invention is more concerned with the position of the moving target for tracking purposes. In addition to using a predetermined decibel level to indicate the presence of a target, a predetermined decibel level of a relatively lower amount may be used to define a perimeter or a reference point of the target. For the illustrated embodiment of FIG. 2, the first target data grouping 114 defines a perimeter and defines a first reference point 120 at the upper left (positive y- and negative x-directions) of the perimeter of the first target data grouping. The first target data grouping 114 may also define an additional reference point 122 at the lower right (negative y- and positive x-directions) of the perimeter of the first target data grouping 114. However, it should be appreciated that further embodiments of the present invention may define a first reference point at any relative point on or around the first target data grouping, such as a center of the target data grouping or along an edge of the target data grouping, to list two non-limiting examples. The first reference point of the first target data grouping advantageously comprises two-dimensional positional information, such as x- and y-directional information, radial distance, and angular position information, or other coordinate system information.

Referring again to FIG. 2 the first target data grouping 116 representative of the target 16 of FIG. 1 is also shown defining a first reference point 124 and an additional reference point 126. As mentioned above, the first reference point may be at any position on or around the first target data grouping, such as the additional reference point or the center of the first target data grouping to list non-limiting examples. Advantageously, the radar device of the present invention defines the first reference point of the first target data grouping in a consistent manner for all target data groupings at all times for consistent comparison of target reference points. For tracking purposes, the reference points are representative of the position of the target.

It should be appreciated that more than one reference point per target may be used for comparison during the various times to track the moving target. It should also be appreciated that the scanning of the area and the determination of the position of the target based upon the target data groupings and reference points are performed substantially concurrently, and may depend upon responsiveness of the radar device and/or the processing speed of the processing circuitry. Accordingly, the radar device effectively provides real-time position data of targets, which may be used in determining the trajectory of the autonomous vehicle as described more fully below. Furthermore, it should be appreciated that the present invention advantageously includes a memory for storage of such position data for comparison with subsequent position data. The position data may be stored for any period of time sufficient to facilitate such comparison of position data.

At a second time, that is different than the first time described above, the area scanned at the first time, or substantially the same area, is scanned with radar signals to receive a second plurality of target data signals indicative of a position of the target at the second time. This step is advantageously performed in the same manner as described above for the first time. The second plurality of target data signals is used to determine the position of the target at the second time by collecting the second plurality of target data signals into a second target data grouping and defining a second reference point, also in a similar manner as described above for the first time. It is advantageous to use the same procedures for both the first and second times, as well as all other times, which it should be appreciated may also be considered relative first and second times, to eliminate any variance that may result from using different procedures. Such variance is undesirable because it would presumably decrease the accuracy of the present invention.

Referring to FIG. 3, the second plurality of target data signals for the target 14 of FIG. 1 is collected into the second target data grouping 114' defining a second reference point 120' and an additional reference point 122'. Similarly, a second plurality of target data signals for the target 16 of FIG. 1 is collected into the second target data grouping 116' of FIG. 3 defining a second reference point 124' and an additional reference point 126'. The second reference point for each second target data grouping is located at the same relative position on the second target data grouping as the first reference point on the first target data grouping. Once the second reference point or points of the target have been determined, they may be compared to the first reference point or points to track the target.

Tracking the moving target enables the present invention to determine the position of the moving target and to advantageously implement a specific action in response to such movement of the target. To track the moving target, the first reference point of the target at the first time is compared to the second reference point of the target at the second time. Because the time interval between the first and second times is known and the distance traversed by the moving target is determined, the present invention is capable of determining the speed and direction of the moving target. If the respective reference points of a target data grouping change more than a predetermined amount, such amount being primarily dependent upon the sweeping speed of the radar device and the anticipated speeds of the moving target, the present invention advantageously eliminates such target data grouping from consideration because such target data groupings most likely did not represent an actual moving target. In addition, if the present invention is tracking two or more moving targets, the present invention compares the reference point(s) for each target between sequential scans to determine the shortest distance ("nearest-neighbor" approach) between the reference points to correlate the targets. However, further embodiments of the present invention may compare the more recent target data groupings to subsequent target data groupings for possible tracking by alternative techniques. Still further embodiments of the present invention may advantageously comprise the step of predicting at least one future position of the moving target at a third time, that is subsequent to the first and second times, based upon the previously tracked positions of the moving target. Such prediction may be performed by extrapolating the future position based upon the previous positions of the moving target. Additional embodiments of the present invention may use the predicted future position of the moving target to correlate first and second reference points to track two or more moving targets between sequential scans.

For the embodiment of the present invention comprising an autonomous vehicle 10, the tracked positions of the moving target 14 or 16 of FIG. 1 relative to the vehicle is used to determine the trajectory of the vehicle. For example, were the moving target 14 or 16 to move within a predetermined distance of the vehicle 10 or if the system and method of the present invention were to predict, based upon an existing trajectory of the vehicle, a potential collision between the moving target and the vehicle, the system and method of the present invention would determine a new trajectory for the vehicle to potentially avoid such a collision. Further embodiments may use the tracked position of the moving target for alternative purposes, such as an aircraft tracking an incoming projectile, such as a missile, to avoid such a projectile or a watercraft tracking an incoming projectile, such as a torpedo, to avoid such a projectile, to list non-limiting examples of further uses of the present invention. Still further embodiments may conversely use the tracked position of the moving target to affect an engagement of the moving target with the vehicle or other device, such as determining a trajectory of an aircraft to engage a refueling boom or determining a trajectory of a watercraft to engage another watercraft.

For embodiments of the present invention where the radar device 12 is moving, such as when the radar device is mounted to an autonomous vehicle as in FIGS. 1–3, the present invention advantageously converts the positions of the moving target from a vehicle coordinate system to an inertial coordinate system. This conversion of coordinate systems is possible if the position of the autonomous vehicle 10 is concurrently determined so that such change in the position of the radar device 12 is used to convert the known location of the radar system from a vehicle coordinate system to an inertial coordinate system. Such determination of the position of the autonomous vehicle may be determined by using alternative devices, such as GPS or other radar devices, or the radar device of the present invention by comparison to fixes objects that are located by the radar device, to list a few non-limiting examples. By using inertial coordinates, rather than vehicle coordinates, to track the moving target, the present invention will be able to predict future positions of the moving target independently of the movement of the radar device, which may otherwise create additional variables that may complicate the tracking of the moving target. Furthermore, using inertial coordinates allows the elimination of clutter, such as unwanted target data signals from non-target objects, by comparing sequential target data signals to determine the target data signals that indicate a moving target, a stationary target, or even signal noise, to list a few non-limiting examples. Accordingly, the present invention provides for the tracking of a moving object in highly-cluttered environments.

The present invention provides for the tracking of a moving target independent of Doppler information by comparing the sequential positions of the moving target. Such tracking of a moving target is particularly advantageous for tracking tangential movement of the target relative to the radar device, for which Doppler information would not facilitate tracking of the moving target. Such tracking of the moving target not only provides real-time position data of the target, but also enables determinations of a trajectory of an autonomous vehicle to move the vehicle in a desired manner relative to the moving target. Still further advantages are provided by the various embodiments of the present invention.

Figure 4:
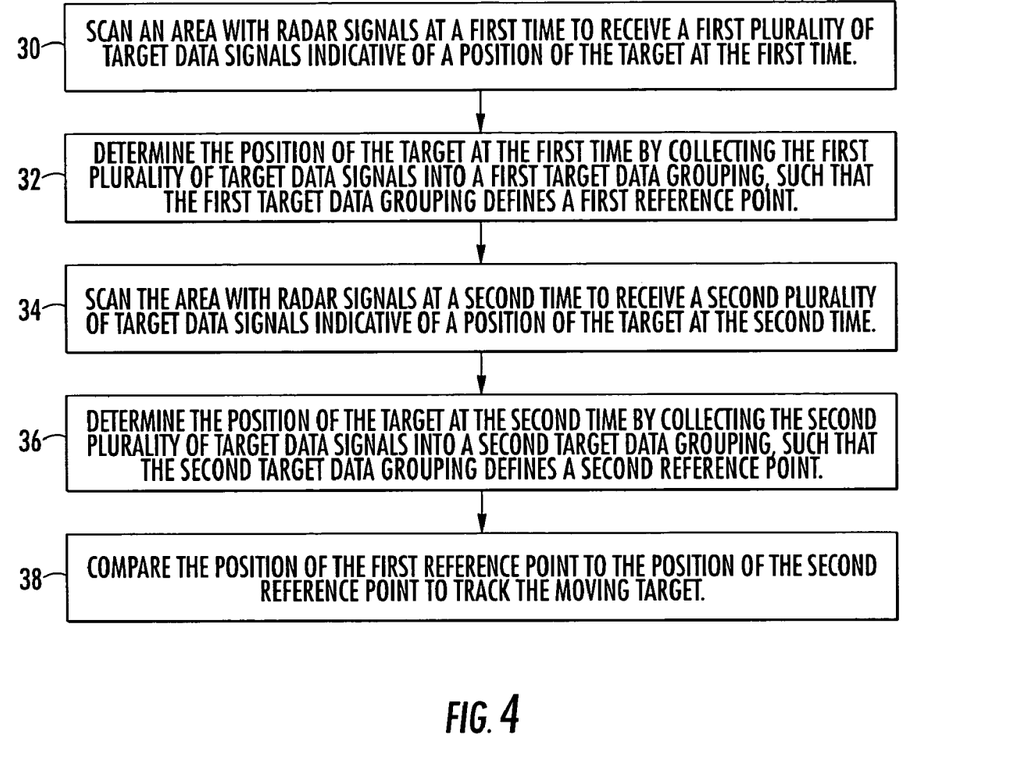
FIG. 4 is a flow chart illustrating steps to track the position of a moving target without the use of Doppler information in accordance with one embodiment of the present invention.

FIG. 4 is a flow chart illustrating steps 30 through 38 for tracking a moving target without requiring the use of Doppler information. Step 30 comprises scanning an area with radar signals at a first time to receive a first plurality of target data signals indicative of a position of the target at the first time. Step 32 comprises determining the position of the target at the first time by collecting the first plurality of target data signals into a first target data grouping, such that the first target data grouping defines a first reference point. Furthermore, step 34 comprises scanning the area with radar signals at a second time to receive a second plurality of target data signals indicative of a position of the target at the second time. Step 36 comprises determining the position of the target at the second time by collecting the second plurality of target data signals into a second target data grouping, such that the second target data grouping defines a second reference point. Finally, step 38 comprises comparing the position of the first reference point to the position of the second reference point to track the moving target, such that no Doppler information is used when comparing the first and second reference points. Further embodiments of the present invention may comprise additional steps, fewer steps, and/or alternative steps to determine an angular position of a target.

The measurements, determinations, calculations, and other actions provided by the present invention are advantageously performed by an apparatus with processing circuitry, such as a processor or other computing device. Such processor or other computing device advantageously actuates the target positioning system to scan the target with scanning signals and determines the target data relationship to determine the angular position of the target relative to the target positioning system. The various methods of the present invention are generally implemented by a computer program product that may direct the operation of the processing circuitry. This computer program product includes a computer-readable storage medium, such as a non-volatile storage medium, and computer-readable program code portions, such as a series of computer instructions, embodied in the computer-readable storage medium. Further implementations of the present invention may be performed by alternative devices.

It will be understood that each step 30 to 38 of the flowchart can be implemented by or with computer program instructions. These computer program instructions may be loaded onto processing circuitry, such as on a computer or other programmable apparatus to perform the functions of the present invention, such that the instructions which execute on the computer or other programmable apparatus create means for implementing the functions specified in the flowchart blocks or steps. These computer program instructions may also be stored in a computer-readable memory that can direct a computer or other programmable apparatus to function in a particular manner, such that the instructions stored in the computer-readable memory perform the measurements, determinations, and actions illustrated in the flowchart blocks or steps. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart blocks or steps.

Accordingly, blocks or steps of the flowchart of FIG. 4 support combinations of means for performing the specified functions, combinations of steps for performing the specified functions, and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended That which is claimed:

1. A method of tracking at least one moving target with a radar device without requiring the use of Doppler information, the method comprising the steps of:

scanning an area with radar signals at a first time to receive a first plurality of target data signals indicative of a position of the target at the first time;

determining the position of the target at the first time by collecting the first plurality of target data signals into a first target data grouping, such that the first target data grouping defines a first reference point;

scanning the area with radar signals at a second time, that is different than the first time, to receive a second plurality of target data signals indicative of a position of the target at the second time;

determining the position of the target at the second time by collecting the second plurality of target data signals into a second target data grouping, such that the second target data grouping defines a second reference point; and comparing the position of the first reference point to the position of the second reference point to track the moving target, such that no Doppler information is required when comparing the first and second reference points.

2. A method according to claim 1, further comprising the step of predicting at least one future position of the moving target at a third time, that is subsequent to the first and second times, based upon the previously tracked positions of the moving target.

3. A method according to claim 2 wherein comparing the positions of the target at the first and second times comprises using the predicted future position of a moving target to correlate first and second reference points to track two or more moving targets.

4. A method according to claim 1 wherein scanning the area with radar signals at the first time and the second time comprises continuously sweeping a real beam radar signal through 360°.

5. A method according to claim 1 wherein determining the position of the target at the first time and the second time comprises parameterizing the first and second plurality of target data signals based upon predetermined criteria to define the first and second target data groupings and the first and second reference points.

6. A method according to claim 5 wherein parameterizing the first and second plurality of target data signals comprises comparing the decibel level of the target data signals to the predetermined criteria to identify a moving target and to define the first and second reference points.

7. A method according to claim 1 wherein comparing the positions of the target at the first and second times comprises eliminating target data groupings whose positions at the first and second times have changed more than a predetermined amount.

8. A method of navigating an autonomous vehicle using a radar device without requiring the use of Doppler information so that the vehicle is navigated relative to a moving target, the method comprising the steps of:

scanning an area proximate the vehicle with radar signals at a first time to receive a first plurality of target data signals indicative of a position of the target at the first time;

determining the position of the target at the first time by collecting the first plurality of target data signals into a first target data grouping, such that the first target data grouping defines a first reference point;

scanning the area with radar signals at a second time, that is different than the first time, to receive a second plurality of target data signals indicative of a position of the target at the second time;

determining the position of the target at the second time by collecting the second plurality of target data signals into a second target data grouping, such that the second target data grouping defines a second reference point;

comparing the position of the first reference point to the position of the second reference point to track the moving target, such that no Doppler information is required when comparing the first and second reference points; and determining a trajectory of the vehicle based upon the tracked positions of the moving target relative to the vehicle.

9. A method according to claim 8, further comprising the step of predicting at least one future position of the moving target at a third time, that is subsequent to the first and second times, based upon the previously tracked positions of the moving target, wherein the trajectory of the vehicle is determined in accordance with the predicted future position of the moving target.

10. A method according to claim 9 wherein comparing the positions of the target at the first and second times comprises using the predicted future position of a moving target to correlate first and second reference points to track two or more moving targets.

11. A method according to claim 8, further comprising the step of converting the positions of the target from a vehicle coordinate system to an inertial coordinate system.

12. A method according to claim 11, wherein converting the positions of the target from a vehicle coordinate system to an inertial coordinate system comprises eliminating target data signals from at least one non-target object.

13. A method according to claim 8 wherein scanning the area proximate the vehicle with radar signals at the first time and the second time comprises continuously sweeping a real beam radar signal through 360°.

14. A method according to claim 8 wherein determining the position of the target at the first time and the second time comprises parameterizing the first and second plurality of target data signals based upon predetermined criteria to define the first and second target data groupings and the first and second reference points.

15. A method according to claim 14 wherein parameterizing the first and second plurality of target data signals comprises comparing the decibel level of the target data signals to the predetermined criteria to identify a moving target and to define the first and second reference points.

16. A method according to claim 8 wherein comparing the positions of the target at the first and second times comprises eliminating target data groupings whose positions at the first and second times have changed more than a predetermined amount.

17. An apparatus for tracking at least one moving target with a radar device without requiring the use of Doppler information, the apparatus comprising:

a radar device for: (i) s scanning an area with radar signals at a first time to receive a first plurality of target data signals indicative of a position of the target at the first time; and (ii) s scanning the area with radar signals at a second time, that is different than the first time, to receive a second plurality of target data signals indicative of a position of the target at the second time; and processing circuitry for: (iii) determining the position of the target at the first time by collecting the first plurality of target data signals into a first target data grouping, such that the first target data grouping defines a first reference point; (iv) determining the position of the target at the second time by collecting the second plurality of target data signals into a second target data grouping, such that the second target data grouping defines a second reference point; and (v) comparing the position of the first reference point to the position of the second reference point to track the moving target, such that no Doppler information is required when comparing the first and second reference points.

18. An apparatus according to claim 17 wherein the processing circuitry predicts at least one future position of the moving target at a third time, that is subsequent to the first and second times, based upon the previously tracked positions of the moving target.

19. A method according to claim 18 wherein the processing circuitry compares the positions of the target at the first and second times by using the predicted future position of a moving target to correlate first and second reference points to track two or more moving targets.

20. An apparatus according to claim 17 wherein the radar device scans the area with radar signals at the first time and the second time with a continuously sweeping real beam radar signal through 360°.

21. An apparatus according to claim 17 wherein the processing circuitry determines the position of the target at the first time and the second time by parameterizing the first and second plurality of target data signals based upon predetermined criteria to define the first and second target data groupings and the first and second reference points.

22. An apparatus according to claim 21 wherein the processing circuitry parameterizes the first and second plurality of target data signals by comparing the decibel level of the target data signals to the predetermined criteria to identify a moving target and to define the first and second reference points.

23. An apparatus according to claim 17 wherein the processing circuitry compares the positions of the target at the first and second times to eliminate target data groupings whose positions at the first and second times have changed more than a predetermined amount.

24. A computer program product for tracking at least one moving target with a radar device without requiring the use of Doppler information, the computer program product comprising a computer-readable storage medium having computer-readable program instructions stored therein, the computer-readable program portions comprising:

a first executable portion for scanning an area with radar signals at a first time to receive a first plurality of target data signals indicative of a position of the target at the first time;

a second executable portion for determining the position of the target at the first time by collecting the first plurality of target data signals into a first target data grouping, such that the first target data grouping defines a first reference point;

a third executable portion for scanning an area with radar signals at a second time, that is different than the first time, to receive a second plurality of target data signals indicative of a position of the target at the second time;

a fourth executable portion for determining the position of the target at the second time by collecting the second plurality of target data signals into a second target data grouping, such that the second target data grouping defines a second reference point; and a fifth executable portion for comparing the position of the first reference point to the position of the second reference point to track the moving target, such that no Doppler information is required when comparing the first and second reference points.

25. A computer program product according to claim 24, further comprising a sixth executable portion for predicting at least one future position of the moving target at a third time, that is subsequent to the first and second times, based upon the previously tracked positions of the moving target wherein the second.

26. A method according to claim 25 wherein the fifth executable portion compares the positions of the target at the first and second times by using the predicted future position of a moving target to correlate first and second reference points to track two or more moving targets.

27. A computer program product according to claim 24 wherein the first and third executable portions facilitate scanning of the area with radar signals at the first time and the second time by continuously sweeping a real beam radar signal through 360°.

28. A computer program product according to claim 24 wherein the second and fourth executable portions determine the position of the target at the first time and the second time by parameterizing the first and second plurality of target data signals based upon predetermined criteria to define the first and second target data groupings and the first and second reference points.

29. A computer program product according to claim 28 wherein the second and fourth executable portions parameterize the first and second plurality of target data signals by comparing the decibel level of the target data signals to the predetermined criteria to identify a moving target and to define the first and second reference points.

30. A computer program product according to claim 24 wherein the fifth executable portion compares the positions of the target at the first and second times to eliminate target data groupings whose positions at the first and second times have changed more than a predetermined amount.

* * * * *